(12) United States Patent
Hayashi et al.

(10) Patent No.: US 8,357,624 B2
(45) Date of Patent: *Jan. 22, 2013

(54) LENS AND PROCESS FOR THE PRODUCTION THEREOF

(75) Inventors: Kazutaka Hayashi, Yokohama (JP);
Kouichi Satou, Nishitokyo (JP);
Koichiro Shiraishi, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/727,159

(22) Filed: Mar. 23, 2007

(65) Prior Publication Data
US 2007/0225147 A1  Sep. 27, 2007

(30) Foreign Application Priority Data
Mar. 27, 2006 (JP) .................. 2006-085914

(51) Int. Cl.
*C03C 3/15* (2006.01)
*C03C 3/068* (2006.01)

(52) U.S. Cl. .......... 501/901; 501/50; 501/78; 501/79; 501/900; 65/64; 65/102; 65/126

(58) Field of Classification Search ........ 501/50, 501/901, 92, 78, 79, 902, 903; 65/64, 102, 65/126
See application file for complete search history.

(56) References Cited

U.S. PATENT DOCUMENTS

| | | | |
|---|---|---|---|
| 3,958,999 A * | 5/1976 | Izumitani et al. | 501/51 |
| 5,987,922 A * | 11/1999 | Hirota et al. | 65/64 |
| 6,187,407 B1 | 2/2001 | Zou et al. | |
| 6,645,894 B2 * | 11/2003 | Endo | 501/51 |
| 6,806,217 B2 * | 10/2004 | Furukawa et al. | 501/78 |
| 6,844,279 B2 * | 1/2005 | Hayashi et al. | 501/50 |
| 2005/0259334 A1 | 11/2005 | Sekita | |
| 2006/0079389 A1 * | 4/2006 | Hayashi | 501/50 |
| 2007/0217031 A1 * | 9/2007 | Hayashi | 359/718 |
| 2007/0291377 A1 | 12/2007 | Sekita | |

FOREIGN PATENT DOCUMENTS

| | | |
|---|---|---|
| JP | 56-164033 | 12/1981 |
| JP | 07-043504 | 2/1995 |
| JP | 11-228167 | 8/1999 |
| JP | 2005-47732 A | 2/2005 |
| JP | 2005-331641 | 12/2005 |

* cited by examiner

*Primary Examiner* — Devang R Patel
(74) *Attorney, Agent, or Firm* — Nixon & Vanderhye P.C.

(57) ABSTRACT

A lens formed of a high-refractivity low-dispersion glass and free of fogging and scorching on its optical-function surface, which is obtained by precision press-molding of an optical glass having a refractive index ($n_d$) of over 1.83, an Abbe's number ($v_d$) of 40 or more and a glass transition temperature ($T_g$) of 640° C. or lower and containing no $Li_2O$ and has one form of a meniscus form, a biconcave form or a plano-concave form.

2 Claims, 2 Drawing Sheets

LENS AND PROCESS FOR THE PRODUCTION THEREOF

This application claims priority to Japanese patent application 2006-085914 filed Mar. 27, 2006, the entire content of which is hereby incorporated by reference in this application.

FIELD OF THE INVENTION

The present invention relates to a lens formed of a high-refractivity low-dispersion optical glass and a process for the production thereof.

TECHNICAL BACKGROUND

In recent years, there are growing demands for zoom lenses having large aperture ratios with tendencies toward the higher performance of digital cameras. The downsizing of an image-sensing optical system is accordingly required. As a zoom lens to fit with such a requirement, there is proposed an image-sensing optical system as described in JP-A-2005-331641.

The above image-sensing optical system has a first lens group with negative refractivity, a second lens group with positive refractivity and a third lens group with positive refractivity in the direction from an object side to an image side. The first lens group has a makeup of a lens with negative refractive power and a lens with positive refractive power, the second lens group has a makeup of a lens with positive refractive power and a lens with negative refractive power and the third lens group has a makeup of lenses with positive refractive power. The above image-sensing optical system has a member for determining a light reflux of an open F-number in a predetermined position.

When attention is focused on the above first lens group, the lens with negative refractivity (to be referred to as "lens G11" hereinafter) is formed of a glass having high refractivity represented by a refractive index ($n_d$) of over 1.83 and a low dispersion property represented by an Abbe's number ($v_d$) of 40 or more, and it is a concave meniscus lens both surfaces of which have aspherical forms. On the other hand, the lens with positive refractivity (to be referred to as "lens G12" hereinafter) is a spherical convex meniscus lens formed of a glass having high refractivity represented by a refractive index ($n_d$) of 1.82 or more and a high dispersion property represented by an Abbe's number ($v_d$) of 25 or less.

DISCLOSURE OF THE INVENTION

Problems to be Solved by the Invention

The above lens G12 is a spherical lens and can be produced by grinding and polishing. On the other hand, the lens G11 is an aspherical lens, so that it is desirable to produce it by a precision press molding method that is also called an optics molding method. The glass for constituting the lens G11 is required to have a low-temperature-softening property suitable for precision press-molding.

From the viewpoint of optical properties, both the lenses G11 and G12 are desirably formed of high-refractivity glasses for downsizing. In a zoom lens, further, it is desired to correct the chromatic aberration of each of the lens groups. And, when a difference in Abbe's number between the glass constituting the lens G11 and the glass constituting the lens G12 is increased and when the refractive index of each lens is increased, both the well correction of the chromatic aberration and the downsizing can be satisfied.

For complying with the above requirement, it is at least required to produce the lens G11 from a glass having an Abbe's number ($v_d$) of 40 or more, and it is also required to increase the refractive indices ($n_d$) of the lenses G11 and 12 to 1.82 or more.

The lens G12 is formed of a high-refractivity high-dispersion glass having a refractive index ($n_d$) of 1.82 or more and an Abbe's number ($v_d$) of 25 or less. For further increasing the refractive index ($n_d$) and further decreasing the Abbe's number ($v_d$), it would be necessary to increase the amount of components that impart the glass with high-refractivity and high-dispersion properties, such as $Nb_2O_5$, $TiO_2$ and the like. However, these are components which may increase the coloring of the glass to decrease the transmittance on the short wavelength side of the visible light region. In an image-sensing optical system composed of a number of lenses, such as a zoom lens, it is demanded to increase the transmittance of each lens, so that it is desirable to increase the Abbe's number difference between the lens G12 and the lens G11 in a manner that the Abbe's number ($v_d$) of the glass constituting the lens G12 is not decreased to excess but that the Abbe's number ($v_d$) of the glass constituting the less G11 is increased to 40 or more.

Meanwhile, for realizing the negative refractivity, it is required to form lenses whose circumferential portion has a larger thickness than its central portion, such as a concave meniscus lens, a biconcave lens and a plano-concave lens.

For producing a lens having the above form, it is required to carry out molding so as to obtain a volume distribution in which the circumferential portion of a product has a larger thickness than the central portion thereof, by placing a pre-shaped precision press-molding glass material in the center of a press mold and press-extending it with upper and lower mold members, so that there is a great difference between the volume distribution of a glass before the pressing and that of the glass after the pressing as compared with a volume distribution difference that is found with regard to a biconvex lens. Regarding the above press-molding, it is thought that the occurrence of a partial increase or decrease in thickness is desirably prevented by decreasing the viscosity of the glass during the press-molding so that the glass is press-extended in every direction in the press mold.

For increasing the refractive index of a high-refractivity low-dispersion glass, however, it is required to increase the contents of $La_2O_3$, $Gd_2O_3$, etc., as high-refractivity-imparting components, and the glass transition temperature ($T_g$) is hence increased, so that the molding temperature suitable for the press-molding is inevitably increased. When the molding temperature is high, however, there are caused problems such as a decrease in the durability of a press mold, the fusion of glass material to a molding surface, the fogging of surface of a molded product, and the like, and it is difficult to stably produce high-accuracy lenses. While an increase in the glass transition temperature can be controlled to some extent by introducing $Li_2O$ as a glass component, failures such as fogging or scorching take place on the surface of a molded product.

The above problems are conspicuously found with regard to a concave meniscus lens and a biconcave lens which are obtained through a great change from the volume distributions that the glass has before the press-molding to the volume distribution that the glass has thereafter. And, the above problems also arise in a plano-concave lens and a convex meniscus lens.

It is an object of the present invention to overcome the above problems and provide a lens having an optical-function surface free of defects such as fogging or scorching and having a meniscus form, a biconcave form or a plano-concave form, obtained by precision press-molding of a high-refractivity low-dispersion glass having a refractive index ($n_d$) of over 1.83 and an Abbe's number ($v_d$) of 40 or more, and a process for the production thereof.

MEANS TO SOLVE THE PROBLEMS

As means for solution of the above problems, the present invention provides;

(1) a lens formed of an optical glass having a refractive index ($n_d$) of over 1.83, an Abbe's number ($v_d$) of 40 or more and a glass transition temperature ($T_g$) of 640° C. or lower and containing no $Li_2O$ and obtained by precision press-molding and the lens having one form of a meniscus form, a biconcave form or a plano-concave form, (2) a lens as recited in the above (1), wherein the optical glass contains, as essential components, $B_2O_3$, $La_2O_3$ and ZnO and has contents of said components determined to give an refractive index ($n_d$) of over 1.83, an Abbe's number ($v_d$) of 40 or more and a glass transition temperature ($T_g$) of 640° C. or lower, (3) a lens as recited in the above (2), wherein the optical glass contains, by mol %, 20 to 45% of $B_2O_3$, 5 to 24% of $La_2O_3$ and 22 to 42% of ZnO, (4) a lens recited in any one of the above (1) to (3), which has a concave meniscus form or a biconcave form, (5) a process for the production of a lens by heating and precision press-molding a glass material, which comprises introducing a glass material formed of an optical glass having a refractive index ($n_d$) of over 1.83, an Abbe's number ($v_d$) of 40 or more and a glass transition temperature ($T_g$) of 640° C. or lower and containing no $Li_2O$ into a press mold and precision press-molding the glass material to produce a lens having one form of a meniscus form, a biconcave form or a plano-concave form, (6) a process for the production of a lens as recited in the above (5), which uses, as the glass material, an optical glass containing $B_2O_3$, $La_2O_3$ and ZnO as essential components and having contents of said components determined to give an refractive index ($n_d$) of over 1.83, an Abbe's number ($v_d$) of 40 or more and a glass transition temperature ($T_g$) of 640° C. or lower, (7) a process for the production of a lens as recited in the above (6), wherein said glass material is formed of an optical glass containing, by mol %, 20 to 45% of $B_2O_3$, 5 to 24% of $La_2O_3$ and 22 to 42% of ZnO, (8) a process for the production of a lens as recited in any one of the above (5) to (7), wherein a les having a concave meniscus form or a biconcave form is obtained by the precision press-molding, (9) a process for the production of a lens as recited in any one of the above (5) to (8), which comprises the steps of
softening the glass material by heating and pressing the glass material with a mold comprising a first mold member whose molding surface for forming an optical-function surface of a lens to be obtained is a concave surface or a flat surface and a second mold member whose molding surface is a convex surface,
cooling said mold until said glass material in said mold comes to have a temperature of a glass transition temperature ($T_g$) or lower, and
taking said glass material cooled out of said mold,
the cooling being carried out in said step of cooling the mold in a manner that the temperature of the first mold member reaches the glass transition temperature ($T_g$) of said glass material before the temperature of the second mold member, and

(10) a process for the production of a lens as recited in any one of the above (5) to (8), which comprises the pressing step of softening the glass material by heating and pressing the glass material with a mold comprising a first mold member whose molding surface for forming an optical-function surface of a lens to be obtained has a relatively large curvature radius or paraxial curvature radius and a second mold member whose molding surface has a relatively small curvature radius or paraxial curvature radius,
the cooling step of cooling said mold until said glass material in said mold comes to have a temperature of the glass transition temperature ($T_g$) or lower, and
the step of taking said glass material cooled out of said mold,
the cooling being carried out in said cooling step in a manner that the temperature of the first mold member reaches the glass transition temperature ($T_g$) of said glass material before the temperature of the second mold member, thereby to produce a biconcave lens.

Figure 1:
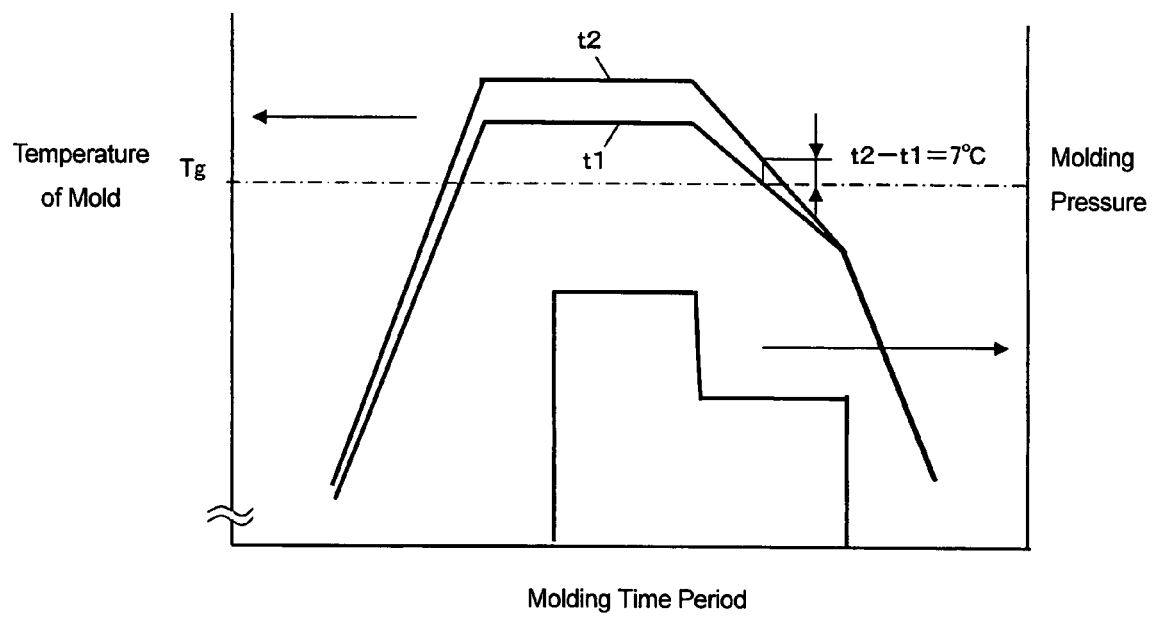
FIG. 1 is a graph showing a change in the temperature of a mold and a change in a molding pressure with the passage of time in a process for the production of a lens in the present invention.

In these Figures, numeral 1 indicates an upper mold member, 2 indicates a lower mold member, 3 indicates a base plate, 4 indicates a base plate, 5 indicates a lower press shaft, 6 indicates an upper press shaft and 7 indicates a sleeve member.

EFFECT OF THE INVENTION

According to the present invention, there can be provided a lens that is obtained by precision press-molding a high-refractivity low-dispersion glass having a refractive index ($n_d$) of over 1.83 and an Abbe's number ($v_d$) of 40 or more, that is free of defects such as fogging and scorching on its optical-function surface and that has a form of a meniscus form, a biconcave form or a plano-concave form, and a process for the production thereof.

PREFERRED EMBODIMENTS OF THE INVENTION

The present inventors have investigated fogging or scorching on lens surfaces and arrived at the following conclusion. It is thought that the fogging or scorching is caused by Li contained in a glass. However, it does not simply mean that this problem is caused solely by Li contained in a glass, but the fogging or scorching is liable to take place when the press-molding temperature is high or the annealing temperature is high. That is, $Li_2O$ is introduced as a glass component for a glass having a predetermined refractive index or higher. In this case, the content of $Li_2O$ is limited to a range that does not incur a decrease in the refractive index. A glass having an $Li_2O$ content in such a range can be precision press-molded, while it is inevitably required to carry out press-molding and annealing at relatively high temperatures. As a result, Li in the glass reacts with a carbon-containing film coated on a glass material surface at a high temperature or Li reacts with carbon dioxide gas that is slightly present in an atmosphere during the annealing that is carried out for removing an internal strain in a lens obtained by precision press-molding, to cause a fogging or scorching on the lens surface. Therefore, the occurrence of the fogging or scorching can be prevented by excluding $Li_2O$, which is a cause thereof, from a glass and decreasing the press-molding temperature and the annealing temperature by decreasing the glass transition temperature to 640° C. or lower. The present invention has been completed on the basis of the above finding.

That is, the lens of the present invention is obtained by precision press-molding an optical glass having a refractive index ($n_d$) of over 1.83, an Abbe's number ($v_d$) of 40 or more and a glass transition temperature ($T_g$) of 640° C. or lower and containing no $Li_2O$ and has a form of a meniscus form, a biconcave form or a plano-concave form.

The optical glass containing no $Li_2O$ means a glass having no content of Li introduced as a glass component and does not necessarily mean the exclusion of a glass containing Li as an impurity. As an index for the impurity level of Li, the Li content of 0.5 mol % or less as $Li_2O$ can be used. Since it is preferred to have the Li content decreased to a lower level, the content of Li as $Li_2O$ is preferably 0.2 mol % or less, more preferably 0.1 mol % or less.

Since the glass transition temperature tends to increase with an increase in refractive index ($n_d$), the present invention is more suitable for a lens formed of an optical glass having a refractive index ($n_d$) of 1.84 or more.

Form the viewpoint of the controlling of a reaction that generates fogging and scorching on a glass surface by decreasing the press-molding temperature and the annealing temperature, the glass transition temperature ($T_g$) of the above glass is 630° C. or lower, more preferably 620° C. or lower.

The present invention is suitable for a meniscus lens, a biconcave lens and a plano-concave lens formed each of a glass having a great difference between the volume distribution of the glass before the pressing and that of the glass after the pressing. Even when the volume distribution of a glass greatly changes as described above, the present invention can provide lenses free of a partial increase or decrease in thickness without causing fogging and scorching. The present invention is suitable for a concave lens, a biconcave lens and a plano-concave lens that are obtained through a greater change in the above volume distribution.

By making use of the lens that is produced by precision press-molding, the lens of the present invention is preferably an aspherical lens. In this case, one optical-function surface of the lens having one of the above various forms may be aspherical, or both the function-surfaces of any lens other than a plano-convex lens may be aspherical.

Since the lens of the present invention is obtained by precision press-molding of a glass having a refractive index ($n_d$) of over 1.83 and an Abbe's number ($v_d$) of 40 or more, it is preferred to use a glass containing, as essential components, $B_2O_3$ and $La_2O_3$ that can impart the glass with the above optical properties. And, ZnO that works to decrease the glass transition temperature is introduced in place of $Li_2O$. The contents of $B_2O_3$, $La_2O_3$ and ZnO are adjusted so as to impart with the glass with properties of a refractive index ($n_d$) of over 1.83, an Abbe's number ($v_d$) of 40 or more and a glass transition temperature ($T_g$) of 640° C. or lower at the same time.

In the above $B_2O_3$—$La_2O_3$—ZnO-based glass, $B_2O_3$ is a component for forming a glass network and is an essential component. Therefore, $B_2O_3$ cannot be precluded from glass components, and it is preferred to introduce 20 mol % or more of $B_2O_3$. However, it is preferred to limit the content of $B_2O_3$ to 45 mol % or less for decreasing its volatility. $B_2O_3$ exhibits volatility at high temperatures, and it is thought that $B_2O_3$ causes fogging and scorching although it does not cause them as much as $Li_2O$. Contents (amounts) of components and additives and total contents shown by % hereinafter represent such contents by mol % except for the content of $Sb_2O_3$ represented by wt %. The content of $B_2O_3$ is more preferably in the range of 20 to 43%, still more preferably 20 to 40%, yet more preferably 22 to 38%, further more preferably 24 to 38%.

$La_2O_3$ is an essential component that increases the refractive index and improves the glass in chemical durability while maintaining the stability of the glass against devitrification and the low-dispersion property of the glass, and it is hence preferred to introduce 5% or more of $La_2O_3$. When it is introduced to excess, the stability of the glass against devitrification is decreased, so that it is preferred to limit its content to 24% or less. The content of $La_2O_3$ is more preferably 6 to 23%, still more preferably 7 to 22%.

ZnO works to decrease the glass transition temperature. Since, however, the chemical durability is decreased and the dispersion is increased when ZnO is introduced to excess, it is preferred to limit the content of ZnO to 22 to 42%. The content of ZnO is more preferably 23 to 41%.

While the above $B_2O_3$—$La_2O_3$—ZnO-based glass contains the above basic components, the above optical glass may contain the following components as optical components.

Like $La_2O_3$, $Gd_2O_3$ is a component that improves the glass in refractive index and chemical durability without degrading the stability of the glass against devitrification and the low-dispersion property of the glass. When over 20% of $Gd_2O_3$ is introduced, the stability against devitrification is degraded and the glass transition temperature is liable to be increased to degrade precision press-moldability, so that it is preferred to introduce 0 to 20% of $Gd_2O_3$. For improving the chemical durability while imparting the glass with high refractivity, it is preferred to introduce 1 to 19% of $Gd_2O_3$. The content of $Gd_2O_3$ is more preferably in the range of 2 to 18%. For improving the stability of the glass, preferably, the glass has a glass composition in which $La_2O_3$ and $Gd_2O_3$ are co-present. When it is intended to apply the optical glass to a use in which a precision press-molding glass material is shaped from a molten glass in the process of cooling of the glass, it is important to increase the stability of the glass as described above for keeping the glass from devitrifying in the shaping process.

In addition, for imparting the glass with a higher refractive index while maintaining a refractive index ($n_d$) of 40 or more, the total content of $La_2O_3$ and $Gd_2O_3$ is preferably 10 to 24%, more preferably 12 to 23%.

$SiO_2$ for a glass having large contents of $La_2O_3$ and $Gd_2O_3$ decreases the liquidus temperature of the glass, improves the high-temperature viscosity of the glass and further greatly improves the stability of the glass. However, when $SiO_2$ is introduced to excess, not only the refractive index of the glass is decreased but also precision press-molding of the glass is difficult due to an increase in the glass transition temperature. The content of $SiO_2$ is therefore preferably 0 to 20%, more preferably 0 to 18%.

$ZrO_2$ is an optional component for imparting the glass with high refractivity and low dispersion. When $ZrO_2$ is introduced, there is produced the effect of improving the glass in high-temperature viscosity and stability against devitrification without decreasing the refractive index of the glass. However, when over 10% of $ZrO_2$ is introduced, the liquidus temperature is sharply increased and the stability against devitrification is degraded, so that the content of $ZrO_2$ is preferably 0 to 10%, more preferably 0 to 8%.

$Ta_2O_5$ is an optional component for imparting the glass with high refractivity and low dispersion. When a small amount of $Ta_2O_5$ is introduced, there is produced the effect of improving the glass in high-temperature viscosity and stability against devitrification without decreasing the refractive index of the glass. However, when over 10% of $Ta_2O_5$ is introduced, the liquidus temperature is sharply increased and the dispersion is increased, so that the content of $Ta_2O_5$ is preferably 0 to 10%, more preferably 0 to 8%.

$WO_3$ is a component that is introduced as required for improving the glass in stability and meltability and increasing the refractive index. However, when the content of $WO_3$ exceeds 10%, the dispersion is increased and the necessary low-dispersion property can be no longer obtained. Therefore, the content of $WO_3$ is preferably 0 to 10%, more preferably 0 to 8%.

$Nb_2O_5$ is an optional component for increasing the refractive index while maintaining the glass stability. However, when it is introduced to excess, the dispersion is increased, so that the content of $Nb_2O_5$ is preferably 0 to 10%, more preferably 0 to 8%.

$TiO_2$ is an optional component that can be introduced for adjusting optical constants. However, when it is introduced to excess, the dispersion is increased and the intended optical constants can be no longer obtained. Therefore, the content of $TiO_2$ is preferably 0 to 10%, more preferably 0 to 8%. Still more preferably, no $TiO_2$ is introduced.

$Bi_2O_3$ works to increase the refractive index ($n_d$) and improve the glass in stability. However, when it is introduced to excess, the glass stability is decreased and the liquidus temperature is increased. Therefore, the content of $Bi_2O_3$ is preferably 0 to 10%, more preferably 0 to 6%.

$GeO_2$ is an optional component that works to increase the refractive index and improve the glass in stability. The content of $GeO_2$ is preferably 0 to 10%, more preferably 0 to 8%. Since, however, $GeO_2$ is prodigiously expensive as compared with other components, it is more preferred to introduce no $GeO_2$.

$Ga_2O_3$ is also an optional component, that works to increase the refractive index and improve the glass in stability. The content of $Ga_2O_3$ is preferably 0 to 10%, more preferably 0 to 8%. Since, however, $Ga_2O_3$ is prodigiously expensive as compared with other components, it is more preferred to introduce no $Ga_2O_3$.

$Al_2O_3$ increases the high-temperature viscosity and liquidus temperature of the glass and works to improve the moldability of the glass. It also works to improve the chemical durability of the glass. However, when it is introduced to excess, the refractive index is decreased and the stability against devitrification is also decreased, so that the content of $Al_2O_3$ is preferably 0 to 10%, more preferably 0 to 8%.

BaO is an optional component that is used for imparting the glass with high refractivity and low dispersion properties, and when a small amount of BaO is introduced, it improves the glass in stability and chemical durability. However, when over 10% of BaO is introduced, the stability of the glass against devitrification is greatly impaired and the glass transition temperature and sag temperature are increased. Therefore, the content of BaO is preferably 0 to 10%, more preferably 0 to 8%.

$Y_2O_3$ and $Yb_2O_3$ are optional components that are used for imparting the glass with high refractivity and low dispersion properties. When a small amount each of them is introduced, the stability and chemical durability of the glass are improved. When it is introduced to excess, the stability of the glass against devitrification is greatly impaired, and the glass transition temperature and sag temperature are increased. Therefore, the content of $Y_2O_3$ is preferably 0 to 10%, more preferably 0 to 8% and the content of $Yb_2O_3$ is preferably 0 to 10%, more preferably 0 to 8%.

In addition, the total content of $La_2O_3$, $Gd_2O_3$, $Y_2O_3$ and $Yb_2O_3$ is preferably adjusted to 10 to 24%.

Besides these, $Sb_2O_3$ is added as an antifoaming agent as required. When the amount of $Sb_2O_3$ based on the total content of glass components exceeds 1% by weight, the molding surface of a press mold may be damaged during precision press-molding. When $Sb_2O_3$ is added, therefore, the amount thereof based on the total content of glass components is preferably 0 to 1% by weight, more preferably 0 to 0.5% by weight.

PbO is one of materials of which the introduction is not desirable as a glass component. PbO is harmful and further when a glass material formed of a glass containing PbO is precision press-molded in a non-oxidizing atmosphere, there is caused a problem that lead is deposited on the surface of a molded product to impair the transparency of a lens or that metal lead deposited adheres to a press mold.

$Lu_2O_3$ is less frequently used as a general optical glass component than other components, and it has a high rarity value and is expensive as a raw material for an optical glass, so that it is preferred to introduce no $Lu_2O_3$ in view of a cost. An optical glass having the above glass composition can realize a glass material suitable for precision press-molding without introducing $Lu_2O_3$.

The optical glass desirably contains none of elements that would possibly create environmental problems such as cadmium, tellurium, etc., radioactive elements such as thorium, etc., and toxic elements such as arsenic, etc. Further, it desirably does not contain fluorine in view of problems such as volatilization during melting of the glass.

The above optical glass can be obtained by weighing and formulating oxides, carbonates, sulfates, nitrates, hydroxides, etc., as raw materials so as to obtain an intended glass composition, fully mixing them to prepare a mixture batch, carrying out heating, melting, defoaming and stirring of the batch in a melting vessel to prepare a homogeneous and bubble-free molten glass and shaping it. Specifically, the above optical glass can be produced by a known melting method.

The glass material to be precision press-molded is also referred to as "preform", and it is a glass pre-shaped material that is to be heated and precision press-molded. The glass material can be produced by a method in which a molten glass is cast into a casting mold to form a glass shaped material, the glass shaped material is annealed and then cut or split into a plurality of glass pieces and each glass piece is ground and polished to complete a glass material having a mass equivalent to the mass of one precision press-molded product or a method in which a molten glass gob separated from a molten glass that is flowing out is shaped into a glass material while causing the glass gob to float above a glass material shaping mold by applying a gas pressure to the molten glass gob and cooling the glass gob. However, when the glass material is produced by the latter method, preferably, there is employed a method in which a molten glass is dropped, or a method in which the lower end of a molten glass that is flowing out is supported and the support is removed timely as predetermined or the support supporting the lower end of the molten glass is rapidly moved downward, whereby the molten glass gob is separated on the basis of a surface tension without using a cutting blade, so that no cutting mark remains after the molten glass is separated.

The precision press-molding is also called "optics molding" as is well known, and it is a method in which the optical-function surface of an optical element is formed by transfer of the form of molding surface of a press mold. The optical-function surface means a surface that refracts, reflects, diffracts or passes light as an object to be controlled and, for example, the lens surface of a lens corresponds to the optical-function surface.

The surface of the glass material is preferably coated with a carbon-containing film so that the glass fully extends in a mold during the precision press-molding. Desirably, the carbon-containing film is composed of carbon as a main component (a film containing carbon whose content is larger than the content of any other element when the contents of elements in the film are represented by atomic %). Specific examples thereof include a carbon film and a hydrocarbon film. When the glass material surface is coated with a carbon-containing film, the fusion of the glass and the mold surface can be prevented during the precision press-molding. For example, a graphite-like carbon film can be preferably employed as a carbon-containing film. As a method for forming the carbon-containing film, there can be employed a known method using a carbon material, such as a vacuum vapor deposition method, a sputtering method, an ion plating method or the like, or a known method such as a thermal decomposition method using a feed gas such as hydrocarbon.

The carbon-containing film exhibits excellent functions during the precision press-molding as described above. However, when a glass containing $Li_2O$ is precision press-molded, it is one of causes of fogging or scorching on a lens surface. It is considered that the fogging or scorching is caused since Li ion in the glass and carbon in the film react in a high-temperature state to generate a carbonate on the glass surface. The lens of the present invention is formed of the $Li_2O$-free glass, preferably a glass free of alkali metals, so that the occurrence of fogging and scorching on a molded product surface can be prevented even if the precision press-molding is carried out in a state where the carbon-containing film is formed on the glass surface.

The carbonate on the lens surface is generated not only by a reaction between carbon existing in the film on the glass surface and Li ion in the glass but also by bringing a glass material or lens formed of a glass containing Li ion into a high-temperature state in a carbon-containing atmosphere. For example, the carbonate can be generated when a preform is heated in a carbon-containing atmosphere in the formation of a carbon-containing film on the glass material (preform), or it can be also generated when a lens is annealed in a carbon-containing atmosphere, e.g., in the atmosphere. Since, however, the present invention uses the $Li_2O$-free glass, the occurrence of the fogging and scorching on the glass surface can be prevented even if the above treatment is carried out, and the adhesion of the optical thin film to the lens surface can be improved.

Regarding a lens obtained by the precision press-molding, a lens circumferential portion surrounding the optical-function surface is ground or polished in some cases like a centering and edging process. Before the above step of polishing the non-optical-function surface, desirably, the lens is annealed to decrease a strain so that the breaking of the lens may be prevented during the grinding or polishing. In a lens formed of a glass containing $Li_2O$, fogging and scorching take place on the optical-function surface by heating for the annealing. Since, however, the lens of the present invention is free of Li and is obtained by precision press-molding the glass having a glass transition temperature of the predetermined temperature or lower, the fogging and scorching can be prevented, and in a lens provided with an optical thin film on an optical-function surface, produced by precision press-molding, the adhesion of the thin film can be improved. The optical thin film includes an anti-reflection film and a film that reflects light having a predetermined wavelength. Concerning a film structure, it may be a single-layer film or may be a multi-layer film.

The anti-reflection film can be obtained by employing materials such as magnesium fluoride, silicon oxide, aluminum oxide, zirconium oxide, titanium oxide, tantalum oxide, etc., determining a film thickness and a film constitution according to a known method and forming a predetermined film on the lens surface by a method such as a vapor deposition method or the like. In addition, since the lens is used in an image-sensing optical system, a multi-layer structure is preferably employed as a film structure so that the anti-reflection effect can be obtained in the entire visible light region.

The process for the production of a lens, provided by the present invention, will be explained below. The process for the production of a lens, provided by the present invention, is a process for the production of a lens by heating and precision press-molding a glass material, which comprises introducing a glass material formed of an optical glass having a refractive index ($n_d$) of over 1.83, an Abbe's number ($v_d$) of 40 or more and a glass transition temperature ($T_g$) of 640° C. or lower and containing no $Li_2O$ into a press mold and precision press-molding the glass material to produce a lens having one form of a meniscus form, a biconcave form or a plano-concave form. The preferred embodiments of the above optical glass have been already explained, and preferred embodiments of the lens form have been also already explained.

The press mold and molding conditions for the precision press-molding can be selected from those that are known. Since, however, the glass material formed of the $Li_2O$-free glass (preferably, the glass free of alkali metal components) is precision press-molded, the press-molding temperature tends to increase as compared with the press-molding temperature for a glass having a large content of $Li_2O$. Under the circumstances, it is preferred to use a press mold made of SiC having remarkably high heat resistance. It is preferred to form a carbon-containing film, preferably a carbon film, on the molding surface of the mold made of SiC. The carbon film can be formed by a vapor deposition or CVD method or some other method. When this mold is used, it is preferred to use a glass material that is surface-coated with the above-explained carbon-containing film for carrying out excellent precision press-molding.

In the precision press-molding using at least one of a press mold made of SiC, a press mold whose molding surface is provided with a carbon-containing film and a glass material that is surface-coated with a carbon-containing film, it is preferred to carry out the precision press-molding in an atmosphere of a non-oxidizing gas such as a nitrogen gas or a mixture of a nitrogen gas with a hydrogen gas for preventing the oxidation of the molding surface of a press mold or a release film formed on the above molding surface and the oxidation of a coating on the glass material surface. In the non-oxidizing atmosphere, the carbon-containing film coating the glass material surface is not oxidized, and this film remains on the surface of a molded product obtained by the precision press-molding. The above film is to be finally removed. For relatively easily and completely removing the carbon-containing film, a lens can be heated in an oxidizing atmosphere, e.g., in the atmosphere. Since the glass constituting the lens is free of $Li_2O$, preferably free of alkali components, there is no case where carbon in the carbon-containing film or carbon dioxide in the atmosphere reacts with Li ion in the glass to form a carbonate on the glass surface, so that the carbon-containing film can be removed while preventing fogging and scorching.

In addition, the carbon-containing film is required to be oxidized and removed at a temperature at which the lens would not be deformed by heating or lower. Specifically, it is preferred to carry out the oxidation and removal in a temperature range below the glass transition temperature.

In the process for the production of a lens, provided by the present invention, specifically, a lens is produced through the steps of softening a glass material by heating and pressing the glass material with a mold comprising a first mold member and a second mold member which have molding surfaces for forming optical-function surfaces of a lens to be obtained (to be referred to as "pressing step" hereinafter), cooling said mold until said glass material in said mold comes to have a glass transition temperature ($T_g$) (to be referred to as "cooling step" hereinafter), and taking said glass material cooled out of said mold.

The above process includes two preferred embodiments.

The first embodiment is a process which comprises the steps of softening the glass material by heating and pressing the glass material with a mold comprising a first mold member whose molding surface for forming an optical-function surface of a lens to be obtained is a concave surface or a flat surface and a second mold member whose molding surface is a convex surface (to be referred to as "pressing step" hereinafter), cooling said mold until the said glass material in said mold comes to have a temperature of a glass transition temperature ($T_g$) or lower (to be referred to as "cooling step" hereinafter), and taking said glass material cooled out of said mold, the cooling being carried out in said step of cooling the mold in a manner that the temperature of the first mold member reaches the glass transition temperature ($T_g$) of said glass material before the temperature of the second mold member. This process is suitable for producing a concave meniscus lens, a convex meniscus lens and a plano-concave lens.

The second embodiment is a process which comprises the steps of softening the glass material by heating and pressing the glass material with a mold comprising a first mold member whose molding surface for forming an optical-function surface of a lens to be obtained has a relatively large curvature radius or paraxial curvature radius and a second mold member whose molding surface has a relatively small curvature radius or paraxial curvature radius (to be referred to as "pressing step" hereinafter), cooling said mold until said glass material in said mold comes to have a temperature of the glass transition temperature ($T_g$) or lower (to be referred to as "cooling step" hereinafter), and taking said glass material cooled out of said mold, the cooling being carried out in said cooling step in a manner that the temperature of the first mold member reaches the glass transition temperature ($T_g$) of said glass material before the temperature of the second mold member, thereby to produce a biconcave lens.

In the above first embodiment and second embodiment, when the glass material is precision press-molded with the press mold to obtain a lens whose one optical surface has a concave form (e.g., a concave meniscus lens, a convex meniscus lens and a plano-concave lens), the cooling of the concave-shaped surface (lens surface) is made slower than the cooling of the opposite surface, or when the two surfaces of the lens have concave surfaces (biconcave lens), the cooling of a concave-shaped surface (lens surface) having a smaller curvature radius or paraxial curvature radius is made slower than the cooling of a concave-shaped surface having a larger curvature radius or paraxial curvature radius on the opposite side, whereby the degradation of accuracy of form-transferred surfaces, and as a result, highly accurate lenses formed of a high-refractivity low-dispersion glass can be stably produced.

The above process comprises supplying the above glass material a mold having first and second mold members having opposite molding surfaces corresponding to the form of a lens, press-molding the glass material under a predetermined pressure for a predetermined period of time, starting to cool both the mold and a molded product at the beginning of the press-molding, in the middle of the press-molding or after completion of the press-molding, cooling them to a predetermined temperature and then taking the molded product out of the mold. The temperature conditions of the mold when the glass material is supplied to the mold and when the press-molding is carried out can be determined as required by taking account of the material, form, dimensions, etc., of a lens (glass used).

For example, when the glass materials is heated to its softening temperature or higher and molded in a softened state by applying a predetermined load in an inert gas atmosphere or under vacuum, the glass material can be heated to a temperature at which it has a glass viscosity of approximately $10^6$ to $10^9$ dPa·s and then supplied to the mold having a temperature lower than the above temperature, for example, a temperature corresponding to a glass viscosity of $10^8$ to $10^{11}$ dPa·s. Further, after supplied into the mold, the glass material may be heated to a temperature at which the glass has a viscosity of approximately $10^7$ to $10^{10}$ dpa·s. Then, molding surface forms are transferred to the glass material by the press-molding, the mold and a molded product are cooled close to the glass transition temperature of the molded product while adhesion of the glass to the molding surfaces of the mold is maintained, then, the mold is opened (disassembled) and the molded product can be taken out.

A more preferred embodiment in the first and second embodiments will be explained below with regard to FIG. 1. In FIG. 1, the axis of abscissa shows a molding time period, the axis of ordinate on the left side shows a temperature of a mold and the axis of ordinate on the right side shows a molding pressure, and FIG. 1 schematically shows a change in the temperature of a mold with the passage of time and a change in the molding pressure with the passage of time. In FIG. 1, a graph depicted as a temperature t1 shows the following ta1 in the first embodiment or the following tb1 in the second embodiment. Further, a graph depicted as a temperature t2 shows the following ta2 in the first embodiment or the following tb2 in the second embodiment.

In the first embodiment, the cooling in the cooling step is carried out in a manner that the temperature ta1 of the first mold member whose molding surface is a concave surface or a flat surface reaches the glass transition temperature ($T_g$) of the glass that is being molded, before the temperature ta2 of the second mold member whose molding surface is a convex surface. Preferably, the cooling conditions are so set as to ensure that the temperature ta2 is higher than the temperature ta1 by 5° C. or more when the temperature ta1 reaches the glass transition temperature ($T_g$). In a particularly preferred embodiment, the cooling conditions are so set as to ensure that the temperature ta2 is higher than the temperature ta1, preferably by 5 to 40° C., more preferably by 5 to 30° C., still more preferably 5 to 20° C., when the temperature ta1 reaches the glass transition temperature ($T_g$).

In the second embodiment, the cooling in the cooling step is carried out in a manner that the temperature tb1 of the first mold member having a larger curvature radius reaches the glass transition temperature ($T_g$) of the glass before the temperature tb2 of the second mold member having a smaller curvature radius. Preferably, the cooling conditions are so set as to ensure that the temperature tb2 is higher than the temperature tb1 by 5° C. or more when the temperature tb1 reaches the glass transition temperature ($T_g$). In a particularly preferred embodiment, the cooling conditions are so set as to ensure that the temperature tb2 is higher than the temperature tb1 preferably by 5 to 40° C., more preferably by 5 to 30° C., still more preferably 5 to 20° C., when the temperature tb1 reaches the glass transition temperature ($T_g$)

In FIG. 1, the mold that exhibits a temperature change shown by t1 may be an upper mold member or a lower mold member, and the mold that exhibits a temperature change shown by t2 may be a lower mold member or an upper mold member. If the easiness of molding and the easiness of centering of the glass material (arrangement of the glass material in the center of the mold) are taken into account and when a lens having a flat or concave surface as one optical-function surface and a convex or flat surface as the other optical-function surface is produced by press-molding, preferably, the mold member for molding the concave surface of the lens is an upper mold member and the mold member for molding the convex or flat surface of the lens is a lower mold member. Further, when a lens of which the surfaces are both concave surfaces is produced, properly, the mold member for molding the concave surface having a larger curvature radius R is a lower mold member and the mold member for molding the concave surface having a smaller curvature radius R is an upper mold member.

In the process of the present invention, the cooling is carried out in a manner that the temperature difference (t2−t1) between the two mold members is 5° C. or more at least until the temperature of the mold member having a flat or convex surface or the mold member having a concave surface having a larger curvature radius R reaches the glass transition temperature (T), which is preferred from the viewpoint of decreasing the non-uniformity of shrinkage that occurs in the cooling step is decreased and decreasing the amount of a strain.

In the above manner, there can be obtained various lenses that have predetermined optical properties and forms, that are free of fogging and scorching and that have excellent surface accuracy.

The lens of the present invention and the lens produced by the process of the present invention are suitable as lenses for constituting compact image-sensing optical systems owing to their optical properties and optical-function surfaces formed by precision press-molding. For example, they are suitable as lenses for constituting image-sensing optical systems of digital still cameras, digital video cameras, cameras mounted on cellphones, an in-vehicle cameras, etc., and they are also suitable as lenses or microlens for constituting the image-sensing optical systems of single-lens reflex cameras.

In particular, when combined with a lens formed of a high-dispersion glass, the lens of the present invention and the lens produced by the process of the present invention can correct chromatic aberration by a compact constitution.

EXAMPLES

The present invention will be explained more in detail hereinafter with reference to Examples.

Optical properties of optical glasses were measured according to the following methods.

(1) Refractive Index ($n_d$) and Abbe's Number ($v_d$)

An optical glass was maintained at a temperature between a glass transition temperature ($T_g$) and a sag temperature ($T_s$) and the resultant optical glass was measured for a refractive index ($n_d$) and an Abbe's number ($v_d$) at a temperature decrease rate of −30° C./hour (using "GMR-1" supplied by Kalnew Optics Corporation) according to the refractive index measuring method of Japan Optical Glass Industrial Society Standard.

(2) Glass Transition Temperature ($T_g$) and Sag temperature ($T_s$)

Measurements were made at a temperature elevation rate of 4° C./minutes under a load of 98 mN with an apparatus for thermomechanical analysis "TMA8510" supplied by Rigaku Corporation.

For obtaining glass compositions shown in Tables 1 and 2, oxides, carbonates, sulfates, nitrates, hydroxides, etc., such as $H_3BO_3$, $La_2O_3$, ZnO, $ZnCO_3$, $Gd_2O_3$, $ZrO_2$, etc., as raw materials for introducing glass components were weighed to prepare glass raw materials having a total amount of 250 to 300 g each, and each glass raw material was fully mixed to obtain a prepared batch. Each of the prepared batches was placed in a platinum crucible and melted with stirring in air in an electric furnace maintained at 1,200 to 1,450° C. for 2 to 4 hours. After the melting, each molten glass was cast into a 40×70×15 mm mold made of carbon and was allowed to cool to a glass transition temperature, and immediately thereafter the glass was placed in an annealing furnace, annealed around a glass transition temperature for approximately 1 hour and allowed to cool to room temperature in the furnace to give an optical glass. In the thus-obtained optical glasses, there was deposited no crystal observable through an optical microscope.

Tables 1 and 2 show properties of the thus-obtained optical glasses.

TABLE 1

| Glass composition (mol %) | No. | | | | |
| --- | --- | --- | --- | --- | --- |
| | 1 | 2 | 3 | 4 | 5 |
| $B_2O_3$ | 32.48 | 36.96 | 35.34 | 36.09 | 33.43 |
| $SiO_2$ | 4.54 | 3.14 | 5.44 | 4.29 | 7.79 |
| ZnO | 36.48 | 30.82 | 30.46 | 30.98 | 27.28 |
| $Li_2O$ | 0.00 | 0.00 | 0.00 | 0.00 | 0.00 |
| $La_2O_3$ | 11.36 | 12.11 | 11.97 | 12.02 | 14.81 |
| $Gd_2O_3$ | 4.54 | 5.03 | 4.97 | 4.99 | 3.98 |
| $La_2O_3 + Gd_2O_3$ | 15.9 | 17.14 | 16.94 | 17.01 | 18.79 |
| $ZrO_2$ | 3.03 | 3.14 | 3.89 | 3.82 | 4.68 |
| $Ta_2O_5$ | 3.03 | 3.14 | 3.11 | 2.97 | 4.6 |

TABLE 1-continued

| Glass composition (mol %) | No. 1 | No. 2 | No. 3 | No. 4 | No. 5 |
|---|---|---|---|---|---|
| $WO_3$ | 4.54 | 5.66 | 4.82 | 4.84 | 3.43 |
| $Nb_2O_5$ | 0.00 | 0.00 | 0.00 | 0.00 | 0.00 |
| $GeO_2$ | 0.00 | 0.00 | 0.00 | 0.00 | 0.00 |
| BaO | 0.00 | 0.00 | 0.00 | 0.00 | 0.00 |
| Total | 100.00 | 100.00 | 100.00 | 100.00 | 100.00 |
| Total content of alkali metal oxides | 0.00 | 0.00 | 0.00 | 0.00 | 0.00 |
| $n_d$ | 1.8392 | 1.8392 | 1.8372 | 1.8356 | 1.8515 |
| $v_d$ | 40.0 | 40.0 | 40.5 | 40.5 | 40.2 |
| Glass transition temperature ($T_g$) | 581 | 590 | 594 | 592 | 608 |
| Sag temperature (° C.) | 623 | 635 | 637 | 635 | 655 |

TABLE 2

| Glass composition (mol %) | No. 6 | No. 7 | No. 8 | No. 9 |
|---|---|---|---|---|
| $B_2O_3$ | 34.18 | 36.13 | 36.54 | 42.26 |
| $SiO_2$ | 6.36 | 4.03 | 6.43 | 1.67 |
| ZnO | 28.14 | 28.55 | 24.1 | 21.76 |
| $Li_2O$ | 0.00 | 0.00 | 0.00 | 0.00 |
| $La_2O_3$ | 14.63 | 14.35 | 16.06 | 16.74 |
| $Gd_2O_3$ | 4.05 | 4.11 | 3.21 | 3.35 |
| $La_2O_3 + Gd_2O_3$ | 18.68 | 18.46 | 19.27 | 20.09 |
| $ZrO_2$ | 4.45 | 4.52 | 4.82 | 5.02 |
| $Ta_2O_5$ | 4.69 | 4.76 | 4.82 | 5.02 |
| $WO_3$ | 3.5 | 3.55 | 4.02 | 4.18 |
| $Nb_2O_5$ | 0.00 | 0.00 | 0.00 | 0.00 |
| $GeO_2$ | 0.00 | 0.00 | 0.00 | 0.00 |
| BaO | 0.00 | 0.00 | 0.00 | 0.00 |
| Total | 100.00 | 100.00 | 100.00 | 100.00 |
| Total content of alkali metal oxides | 0.00 | 0.00 | 0.00 | 0.00 |
| $n_d$ | 1.8517 | 1.8517 | 1.8511 | 1.8516 |
| $v_d$ | 40.2 | 40.1 | 40.2 | 40.4 |
| Glass transition temperature ($T_g$) | 604 | 602 | 609 | 614 |
| Sag temperature (° C.) | 650 | 647 | 655 | 657 |
| Liquidus temperature (° C.) | 1040 | 1040 | 1050 | 1050 |
| Viscosity (dPa · s) at liquidus temperature | 5.1 | 4.5 | 4.8 | 3.9 |
| Specific gravity | 5.25 | 5.24 | 5.21 | 5.2 |

Glass materials (preforms) for precision press-molding were produced from the above glasses in the following manner.

First, a molten glass held at 1,050 to 1,450° C. (corresponding to a glass viscosity of 4 to 0.05 dpa·s) in an electric furnace was caused to continuously flow downward from a platinum alloy pipe that was temperature-adjusted to 1,050° C. (corresponding to a glass viscosity of 4 dpa·s) at a constant flow rate, the forward end of the molten glass flow was received with a glass material shaping mold and at a time when a molten glass gob having a predetermined weight was separable from the above forward end, the shaping mold was moved downward at a sufficiently greater speed than the downward flowing speed of the molten glass flow, whereby the molten glass gob was separated. When the molten glass was caused to flow downward, it had a viscosity of 7 dpa·s.

The glass-supporting surface of the glass material shaping mold was constituted of a porous material, and a high-pressure gas was introduced to the reverse side of the porous material and ejected through the porous material.

The separated molten glass gob was shaped into a glass material having one axis of rotational symmetry while the glass gob was caused to float over the above glass-supporting surface of the mold by applying air pressure thereto, and the glass material was annealed. Molten glass gobs obtained in the above manner respectively had masses equivalent to masses of corresponding glass materials obtained in the above manner.

In the shaping of the above glass material, a molten glass is caused to continuously flow out of a temperature-controlled platinum pipe at a constant rate, a glass material shaping mold that is carried to a position beneath the pipe is moved upward to receive the lower end of the molten glass flow. In this state, a narrow portion is formed between the lower end of the molten glass flow and the pipe side thereof, and the glass material shaping mold is caused to rapidly move downward at a predetermined time. By this operation, the molten glass flow is separated in the narrow portion and a molten glass gob including the lower end and having a predetermined weight can be obtained on the glass-supporting surface of the shaping mold.

A plurality of glass material shaping molds are carried to the position beneath the pipe one after another, the above step is carried out to receive molten glass gobs having a predetermined weight each one after another and the molten glass gobs are carried away one after another. The shaping molds are arranged on a turn table and the table is index-turned to carry out the above operation. Each molten glass gob is shaped into a glass material while causing it to float above the glass-supporting surface of the mold. Glass materials were produced by repeating the step of taking a glass material out of a shaping mold, receiving a molten glass gob with the shaping mold and shaping it into a glass material. The glass gob was caused to continuously float until the glass material was taken out of the shaping mold.

Besides the above method of shaping a glass material directly from a molten glass gob, the glass material can be also produced by forming a glass block from a molten glass, annealing the glass block, cutting the glass block to obtain glass pieces and grinding and polishing them.

Figure 2:
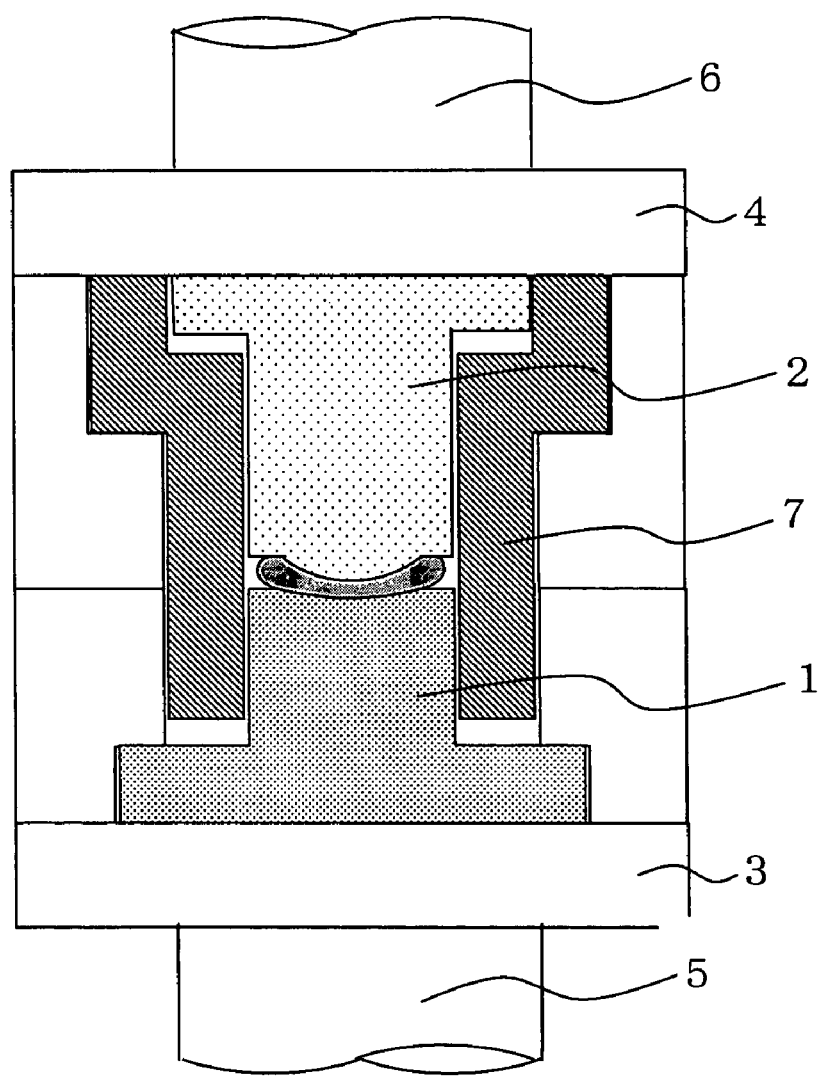
FIG. 2 is a schematic drawing of one example of a pressing apparatus for use in a process for the production of a lens in the present invention.

The following is an Example in which a concave meniscus lens was produced from a glass material produced as described above with a molding apparatus shown in FIG. 2. In the molding apparatus shown in FIG. 2, a lower mold member (first mold member) 1 of which the molding surface is an aspherical concave surface and an upper mold member (second mold member) 2 of which the molding surface is a convex surface are placed inside a heating molding chamber (not shown) hermetically closed with a box, and these two mold members are fixed to forward ends of a lower press shaft 5 and an upper press shaft 6 through base plates 3 and 4, respectively. The lower press shaft is connected to a pressure cylinder (not shown) and it is driven upward when pressing is carried out. In FIG. 2, numeral 7 indicates a sleeve member that controls the positions of the upper mold member 2 and the lower mold member 1 in the radius direction.

Glass materials formed of the optical glass No. 5 shown in Table 1 was used as glass materials and press-molded with a molding apparatus shown in FIG. 2. Each glass material was coated with a carbon film by CVD, and as a mold, there was used a mold in which a carbon film as a mold release film was coated by CVD on the molding surfaces of a mold material made of SiC.

FIG. 1 shows changes in the temperature of an upper mold member, the temperature of a lower mold member and a pressure with the passage of time. When the press-molding was started, the temperature (t2) of the upper mold member was 650° C., the temperature (t1) of the lower mold member was 630° C. and the temperature difference between these two mold members was 20° C. During the pressing, these temperatures were maintained. At a time when the pressing at an initial stage was completed, the temperature (t2) of the upper mold member was 650° C., the temperature (t1) of the lower mold member was 630° C. and the temperature difference between these two mold members was 20° C.

Simultaneously with the completion of the initial-stage pressing, the cooling was started. When the temperature (t1) of the lower mold member reached the glass transition temperature ($T_g$) of the glass material, i.e., 608° C., the temperature (t2) of the upper mold member was 615° C., and the temperature difference between these two temperatures was 7° C. or t2 was higher than t1 by 7° C. Further, with cooling, there was carried out secondary pressing under a load smaller than that of the initial-stage pressing. At the time of completion of the secondary pressing, the difference between the temperature (t1) of the lower mold member and the temperature (t2) of the upper mold member was 4° C. After completion of the secondary pressing, the upper and lower mold members were rapidly cooled, and when it came to be possible to take a molded product out, the mold was disassembled and the molded product (concave meniscus lens) was taken out.

The above press-molding step was repeated 150 times and the thus-obtained concave meniscus lenses were measured for surface accuracy to show that they had excellent accuracy and were free of fogging and breaking and that their accuracy against decentering and their aspherical forms were within standard values. Further, there was not observed any partial non-uniform thickness, either.

When glass materials formed of the other glasses shown in Tables 1 and 2 are used, they can be precision press-molded under conditions similar to those employed for the glass formed of the glass No. 5. These glasses can give concave meniscus lenses that have excellent surface accuracy, that are free of fogging and breaking, that have accuracy against decentering and aspherical forms within the standard values and that are free of a partial non-uniform thickness.

Further, biconcave lenses, plano-convex lenses and convex meniscus lenses can be similarly produced from glass materials formed of the glasses shown in Tables 1 and 2 by using molds corresponding to intended lens forms and optimizing the above various conditions on the basis of properties of the glasses, the forms of the lenses and the like.

Various lenses obtained as described above may be annealed in a temperature range of/below corresponding glass transition temperatures to decrease strains in the lenses and finely adjust their optical properties. When the annealing is carried out in the atmosphere, a carbon films coated on the surface of a glass can be oxidized and removed. When this annealing treatment was carried out, neither fogging nor scorching was observed on the above-obtained lenses.

An optical thin film such as an anti-reflection film or the like may be formed on the surface (optical-function surface) of each of lenses obtained as described above.

The above various lenses are suitable as lenses for constituting compact image-sensing optical systems owing to their optical properties and optical-function surfaces formed by precision press-molding. For example, they are suitable as lenses for constituting image-sensing optical systems of digital still cameras, digital video cameras, cameras mounted on cellphones, in-vehicle cameras, etc., and they are also suitable as lenses or microlens for constituting the image-sensing optical systems of single-lens reflex cameras.

In particular, when combined with a lens formed of a high-dispersion glass, they can also correct chromatic aberration by a compact constitution.

Industrial Utility

The present invention provides a lens formed of a high-refractivity low-dispersion glass and a process for the production thereof, and the above lens is suitable as a lens for constituting an image-sensing optical system of a digital still camera, a digital video camera, a camera mounted on a cellphone, an in-vehicle camera or the like.

The invention claimed is:

1. The process for the production of a lens by precision press-molding a glass material, which comprises the steps of
introducing a glass material formed of an optical glass having a refractive index ($n_d$) of over 1.83, an Abbe's number ($v_d$) of 40 or more and a glass transition temperature ($T_g$) of 640° C. or lower and containing, by mol %, 20 to 43% of $B_2O_3$, 5 to 24% of $La_2O_3$ and 22 to 42% of ZnO, as essential components, and optionally 0 to 18% $SiO_2$, and a total content of $La_2O_3$, $Gd_2O_3$, $Y_2O_3$ and $Yb_2O_3$ is 10 to 24%, and no $Li_2O$, no PbO and no cadmium into a press mold, softening the glass material by heating and pressing the glass material with a mold comprising a first mold member whose molding surface for forming an optical-function surface of a lens to be obtained is a concave surface or a flat surface and a second mold member whose molding surface is a convex surface,
cooling said mold until said glass material in said mold comes to have a temperature of a glass transition temperature ($T_g$) or lower, and
taking said glass material cooled out of said mold,
the cooling being carried out in said step of cooling the mold in a manner that the temperature of the first mold member reaches the glass transition temperature ($T_g$) of said glass material before the temperature of the second mold member.

2. The process for the production of a lens by precision press-molding a glass material, which comprises introducing a glass material formed of an optical glass having a refractive index ($n_d$) of over 1.83, an Abbe's number ($v_d$) of 40 or more and a glass transition temperature ($T_g$) of 640° C. or lower and containing, by mol %, 20 to 43% of $B_2O_3$, 5 to 24% of $La_2O_3$ and 22 to 42% of ZnO, as essential components, and optionally 0 to 18% $SiO_2$, and a total content of $La_2O_3$, $Gd_2O_3$, $Y_2O_3$ and $Yb_2O_3$ is 10 to 24%, and no $Li_2O$, no PbO and no cadmium into a press mold,
softening the glass material by heating and pressing the glass material with a mold comprising a first mold member whose molding surface for forming an optical-function surface of a lens to be obtained has a large curvature radius or paraxial curvature radius and a second mold member whose molding surface has a small curvature radius or paraxial curvature radius, the cooling step of cooling said mold until said glass material in said mold comes to have a temperature of the glass transition temperature ($T_g$) or lower, and the step of taking said glass material cooled out of said mold, the cooling being carried out in said cooling step in a manner that the temperature of the first mold member reaches the glass transition temperature ($T_g$) of said glass material before the temperature of the second mold member, thereby to produce a biconcave lens.

* * * * *